(12) United States Patent
Goubely et al.

(10) Patent No.: US 6,703,728 B1
(45) Date of Patent: Mar. 9, 2004

(54) STEP MOTOR WITH DOUBLE COIL IN A PLANE

(75) Inventors: Aime Goubely, Grave de Peille (FR); Jean Armiroll, Beaulieu su Mer (FR)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/979,278

(22) PCT Filed: May 17, 2000

(86) PCT No.: PCT/FR00/01317

§ 371 (c)(1),
(2), (4) Date: Apr. 11, 2002

(87) PCT Pub. No.: WO00/72429

PCT Pub. Date: Nov. 30, 2000

(30) Foreign Application Priority Data

May 21, 1999 (FR) .............................. 99 06606

(51) Int. Cl.⁷ ........................... H02K 37/14; H02K 1/00
(52) U.S. Cl. ................... 310/49 R; 310/216; 310/257
(58) Field of Search .............................. 310/49 R, 257, 310/112, 114, 216

(56) References Cited

U.S. PATENT DOCUMENTS

| 4,088,909 | A | * | 5/1978 | Matsumura et al. | ...... 310/49 R |
| 4,386,287 | A | * | 5/1983 | Karasawa et al. | ......... 310/49 R |
| 5,132,578 | A | * | 7/1992 | Iwasa et al. | ............. 310/49 R |
| 6,031,304 | A | * | 2/2000 | Suzuki et al. | ............. 310/49 R |

* cited by examiner

*Primary Examiner*—Tran Nguyen
(74) *Attorney, Agent, or Firm*—Roger A. Johnston

(57) ABSTRACT

A dual rotor motor assembly having two coils in lateral arrangement on opposite sides of each rotor, with each rotor having one of the coils in common. The rotors are disposed in pole cages formed in two spaced parallel pole plates; and, the coils are disposed between the plates. In the preferred arrangement the pole plates have a generally "V"-shaped configuration.

2 Claims, 4 Drawing Sheets

STEP MOTOR WITH DOUBLE COIL IN A PLANE

BACKGROUND OF THE INVENTION

The present invention concerns the field of stepping motors. More precisely, it applies to motors that have two induction coils and a rotor that is a permanent magnet Secondly, the-invention also concerns combinations of such motors.

The problem being targeted primarily is one of overall dimensions: when they contain two coils corresponding to two distinct excitation phases, existing stepping motors occupy a relatively high volume, as the coils are positioned one after the other in the direction of the central rotation axis.

This configuration is not appropriate for all uses of stepping motors as the choice of a motor type in an application often depends on the space available for positioning that motor type. In cars, for example, rotary actuators based on stepping motors take up more and more room in vehicles in applications in which increasing miniaturization is required. However, miniaturization is not enough: in some places, it is also necessary to have at one's disposal elements with a particular geometric configuration that can fit into the available space.

BRIEF SUMMARY OF THE INVENTION

To this end, the invention proposes a stepping motor with a globally planar configuration in which the coils no longer act, as in the aforementioned prior art, at axial levels that are different from the permanent magnet that makes up the rotor. On the contrary, they are positioned at the same level and consequently act on the same radial peripheral zone of the rotor.

To this end, the motor in the invention is characterized by a magnetic cylinder head made of two parallel flat plates linked by two spacers around which the aforementioned coils are positioned, two coaxial holes made in the aforementioned plates mark out a cylinder-like space into which the rotor is placed.

The spacers which are shaped like cylindrical columns also form the mechanical link between the parallel flat plates. Therefore, the magnetic circuit of each coil is comprised of two main parts (the flat plates) and two linking elements (the spacers).

Consequently, there is no internal stator, and it is easy to determine the relative positioning of these parts with precision. This characteristic evidently has a favorable impact on the production cost of the motors based on this invention. This cost is further reduced on account of the low number of parts requiring assembly, much less than in the motors with superimposed coils already mentioned.

Generally, producing a flat motor is advantageous as the low thickness makes it easier to integrate the motor into many systems.

To complete the description of this structure, it should be noted that each plate contains teeth that are directed more or less perpendicularly to its plane, in the direction of the other plate; these teeth are positioned along the periphery of the rotor holes; the teeth extending from the two plates interpenetrate and form a cage in which the rotor is housed.

The distance between the periphery of each rotor hole and the free edge of the plate in which it is made is minimal at the level where the diameter of the hole is perpendicular to the straight line joining the axis of the spacers or of the coils, so that the magnetic currents of the two coils do not interfere with each other and are channeled, via the teeth, on each side of the plane formed by the aforementioned diameters of the two holes.

Each phase or coil is therefore schematically associated with a magnetic circuit that includes the spacer, with two plate portions coming to an end where the width on both sides of the rotor hole is minimal; the aforementioned circuit is "dosed" by the teeth—associated with the aforementioned plate portions—which interpenetrate and are separated by a gap.

Preferably, the coils are identical and the aforementioned diameter is the perpendicular bisector of the segment joining the axes of the spacers.

In this case, there is symmetry in the two magnetic circuits corresponding to the two phases; the aforementioned circuits can be seen as being positioned on either side of the rotor and separated by it.

In fact, the teeth forming the cage surrounding the rotor have an angular width that is approximately equal to that of the rotor poles, at least at the weld junction with the plate from which they extend.

Moreover, the teeth positioned on either side of the diameter of the rotor hole perpendicular to the straight line joining the axes of the spacers are arranged with a periodicity that is equal to twice the angular width of each tooth at the weld junction with the plate; they are trapezoid, with their angular width decreasing towards their free extremity.

The trapezoid shape results, in particular, from the necessity of establishing a more or less uniform gap between the adjacent teeth. As far as the periodicity is concerned, there is no continuity along the entire periphery of the cage, in particular, to produce a number of steps per turn equivalent to that of the motors of prior art and in order to ensure the electronic permutation of the phases.

In the Invention, the groups of teeth arranged on both sides of the plane intersecting the diameters of the rotor holes perpendicularly to the line joining the axes of the spacers are staggered by a quarter of an angular period.

As a result of the previous characteristics, with respect to the geometry of the teeth, as well as their periodicity or the aforementioned staggering, one of the plates contains n/2 teeth, whereas the second plate only contains n/2−1 teeth, and the magnetic circuits associated with each coil also contain n/2 and n/2−1 teeth respectively.

According to one possible configuration, the stepping motor in the invention is designed so that the plates have a rectangular central portion and semi-circular extremities, with the rotor hole centered in the central portion and the axes of the spacers, which are cylinder-like, containing the centers of the semi-circular arcs of the aforementioned extremities.

Producing a motor on the basis of the invention is therefore extraordinarily simple when compared with existing motors as it is enough to mount the spacers on a plate, then to add the coils and close the magnetic circuit by assembling the second plate.

According to the invention, that is by adhering to the characteristics underlined above, it is also possible to combine at least two stepping motors; this combination is characterized by the fact that the plates of the aforementioned motors are joined at the level of a spacer, consequently the adjoining motors share a spacer and a coil.

The plates positioned on either side of the spacers are preferably in one piece. Multiple geometric configurations are possible: in one possible configuration, the axes of the coils are coplanar.

In another configuration, the axes of the coils are arranged in two planes intersecting along the axis of the common coil: this results therefore in parallel flat plates forming a V, with the connecting surface between the two arms of the V, as defined previously, having the same thickness naturally as the extremities of the aforementioned arms on account of the part being in one piece.

In the case of two motors being combined, three coils enclose two rotors, with the coil at the base of the V being shared by the aforementioned rotors.

This configuration results in space savings in comparison with the use of two flat motors based on the invention. Moreover, it results in less expense as one less coil, spacer, connector, electronic circuit, housing, etc. are required. However, the two motors are controlled independently.

In addition, by mechanically joining the rotors of the two motors, their engine torque is combined and this confers a very interesting value upon the power/size ratio. The vibrations on the terminal pinion are finally reduced as there are two points of contact, the output noise is consequently reduced.

A two motor combination can also be used with only one motor running: the rotation of the rotor of the second motor, driven by the terminal pinion then creates a signal in the coil that is not shared by this second motor. In its turn, this signal can be used to test the state of the system: existence of a stop, etc . . .

DETAILED DESCRIPTION OF THE INVENTION

Figure 1:
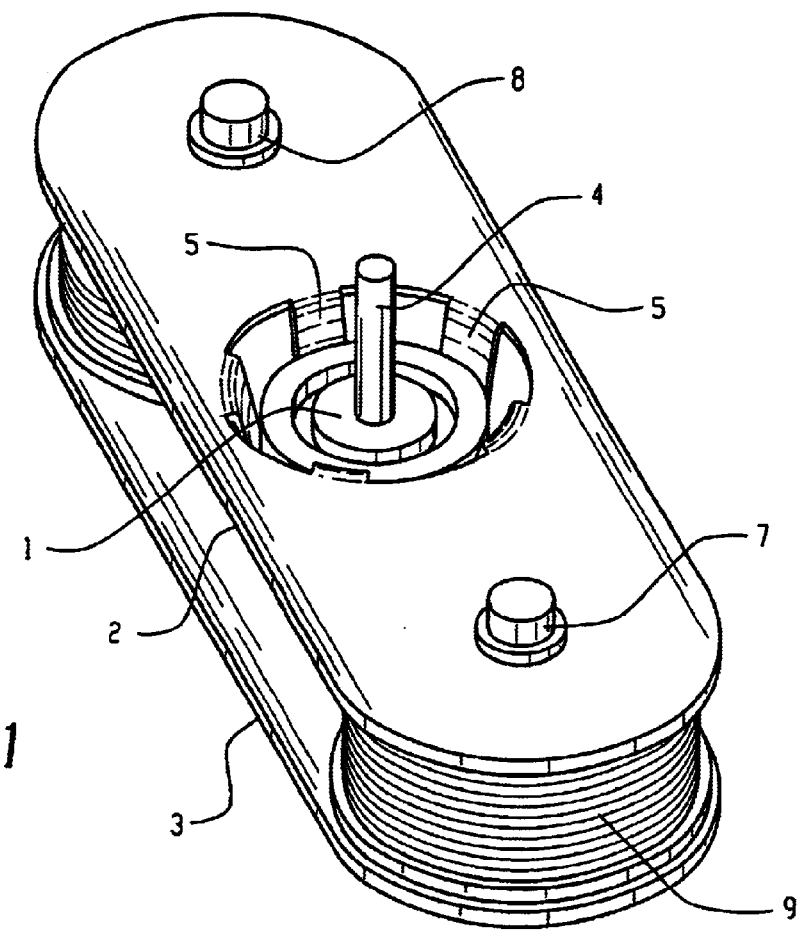
FIG. 1 is a perspective view of a motor based on this invention.

In the perspective view of FIG. 1, as well as in the following figures, the permanent magnet (1) making up the rotor contains, for example, 12 poles that are alternatively north (N) and south (S) and, as we will see, this data conditions the number of teeth extending from the flat plates (2, 3).

The rotor is fitted with an output shaft (4) that can be linked mechanically to a pinion (see FIG. 6), and it turns in the cage formed b y the teeth (5, 6) which extend from plates (2, 3) respectively, perpendicularly and in the direction of the equivalent parallel plate (3, 2).

Figure 2:
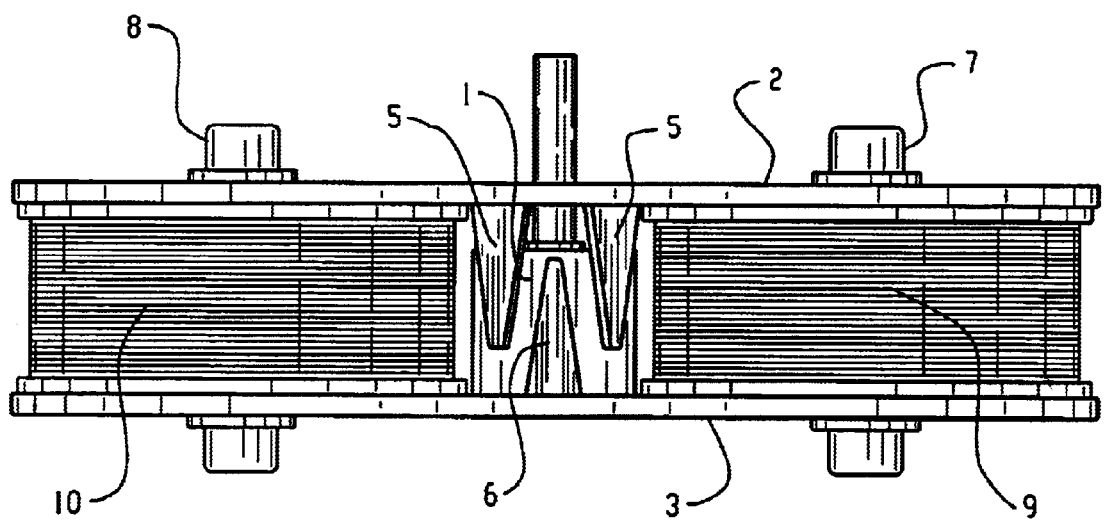
FIG. 2 shows a front view of the motor in FIG. 1.

The aforementioned flat plates (2, 3) are maintained in a parallel position .by means of spacers (7, 8), whose ends only are visible, and around which the coils (9, 10) are arranged; these elements appear more clearly in FIG. 2.

This flat structure contains a central cage formed by the descending teeth (5) and the ascending teeth (6), around which the magnetic induction coils (9, 10) are arranged.

Figure 3:
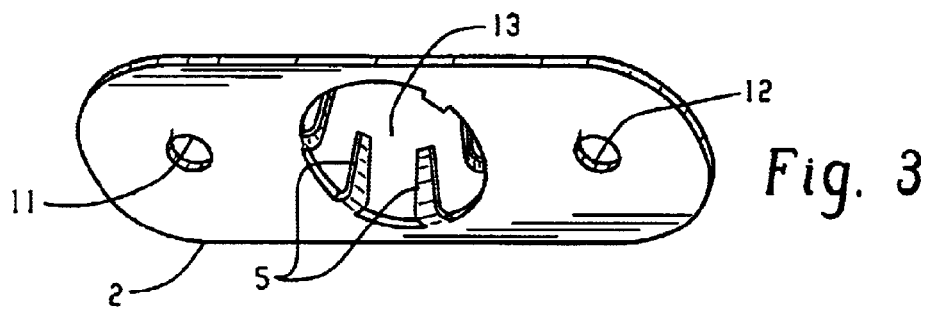
FIG. 3 represents a perspective view of one of the flat plates.

The following figures (3, 4) specify the configuration of each flat plate (2, 3). In FIG. 3, plate (2) contains two end holes (11, 12) whose center merges with the center of the semicircular extremities of the plate (2). The axis of the spacers (7, 8), and consequently of the coils (9, 10), passes through this point as this is where the spacers (7, 8) are connected mechanically to the plate (2).

Figure 4:
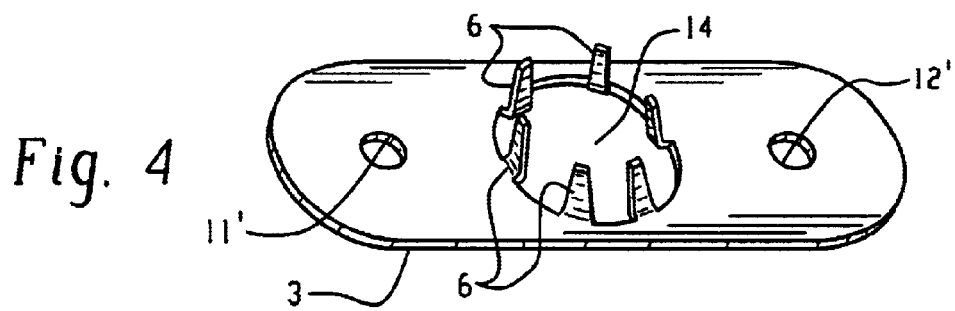
FIG. 4 is a perspective view of the other flat plate.

Plate (3) shown in FIG. 4 contains end holes (11', 12') which have exactly the same characteristics and functions. Their diameter,may vary, however, depending on the shape of the spacers (7, 8).

The flat plate (2) is seen from the outside, whereas the flat plate (3) is shown from inside. When they are connected to each other by means of the spacers (7, 8), the central holes (13, 14) through which the rotor (1) passes are coaxial.

Figure 5:
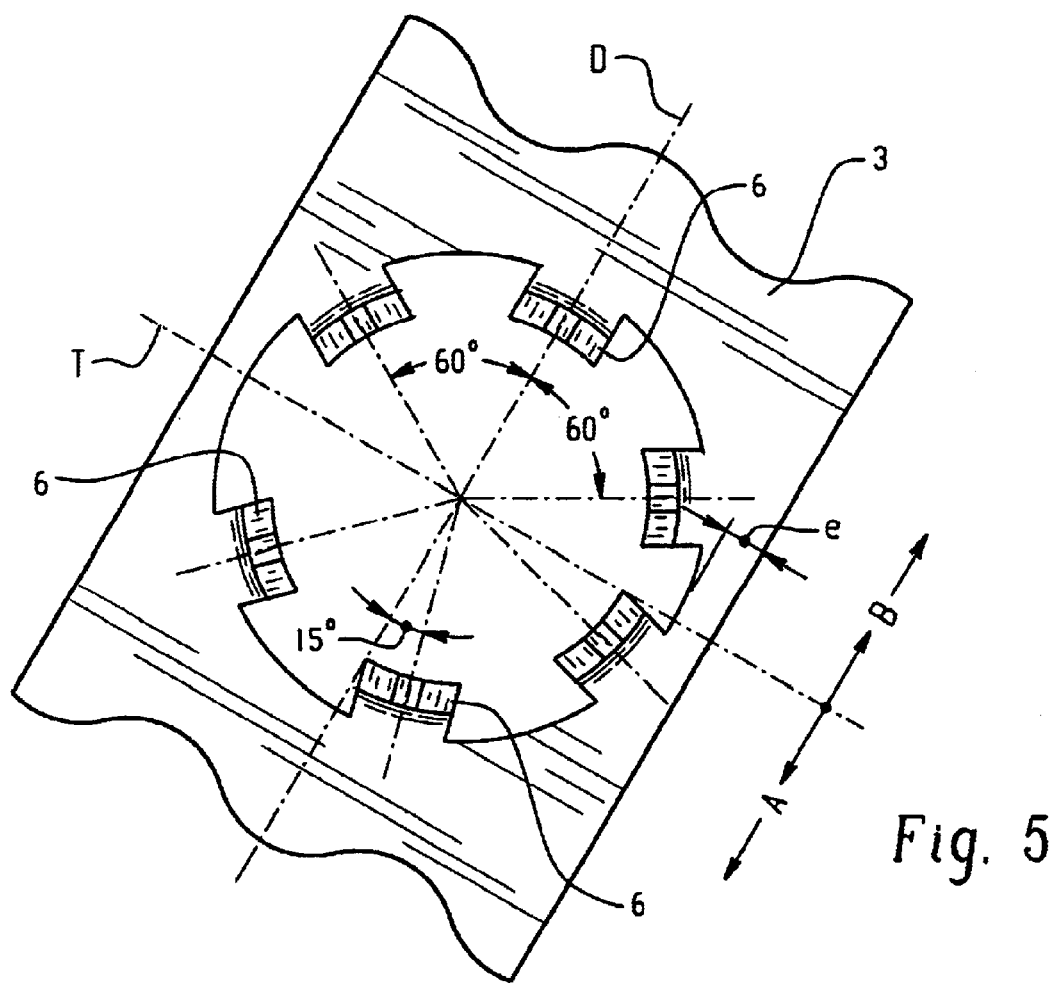
FIG. 5 is a plan view of a portion of the plate from FIG. 4.

These figures also show very clearly the lateral zones with the minimum distance between the aforementioned holes (13, 14) and the lateral edges of the plates (2, 3). This characteristic also appears in FIG. 5, in which the line (T) perpendicular to the straight line (D) linking the two centers of the holes (11') and (12') in plate (3) has been traced.

In fact, this perpendicular line (T) separates the two magnetic circuits associated with the two coils (9, 10). The teeth array in zone A and that in zone B belong to two magnetic circuits that can be considered as different. The small distance (e), combined with the fact that the plates (2, 3) are not thick, does in fact prevent mutual disturbances due to the currents induced by the two coils (9, 10). In any event, it reduces them to an acceptable level.

The drawing only shows the configuration of plate (3). However, for plate (2), it is exactly the same. On both sides of the line (T), the teeth are spaced evenly at 60° and have an angular width of 30° corresponding to the width of the poles of the permanent magnet that makes up the rotor (12 poles, hence an angular sector per pole of 360/12=30°).

Furthermore, there is a 15° mismatch between the teeth of sector A and those of sector B which explains, in particular, the dissymmetry in the angular distances between the teeth situated on both sides of line (T) in the vicinity of the two longitudinal edges of plate (3). As one of these distances is very small, plate (2) will only be able to contain five teeth (5), whereas plate (3) contains six (6). Consequently, the number of steps per turn equals 24.

More generally, a rotor with n poles will function with a plate (2) with n/2–1 teeth and a plate (3) with n/2 teeth. The latter will have n/4 teeth on both sides of line (T), whereas on plate (2) there will be n/4 teeth on one side and n/4–1 teeth on the other. The number of steps available per turn then Increases to 2 n.

Figure 6:
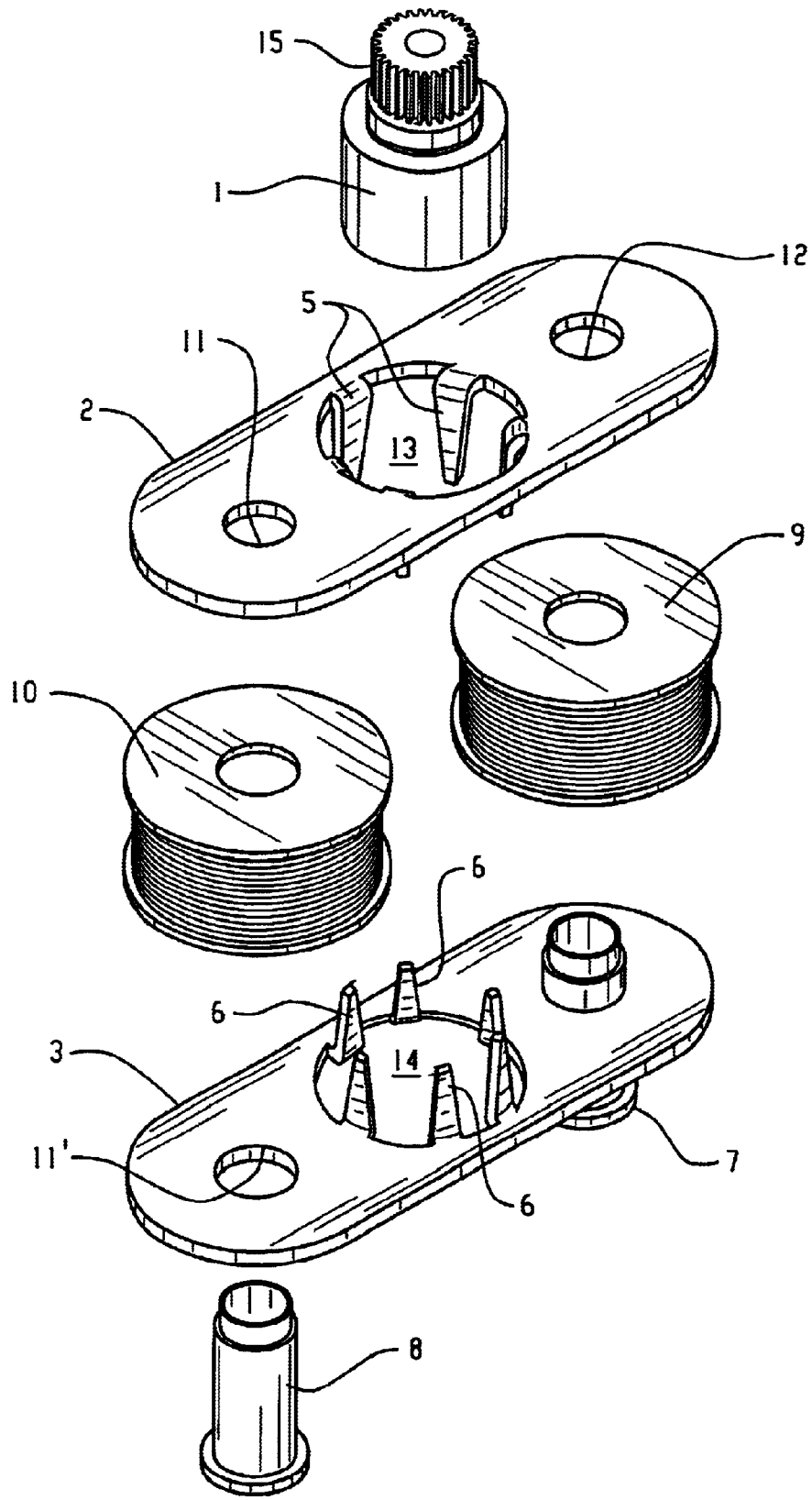
FIG. 6 is an exploded perspective view of the motor in the invention.

FIG. 6 specifies the shape of the spacers (7, 8) fitted with two shoulders Implying in this case that the diameter of holes (11', 12') is greater than that of holes (11, 12). Moreover, the rotor's output shaft (not visible) is fitted with the drive pinion (15) of a downstream mechanism (reducer . . . ).

Figure 7:
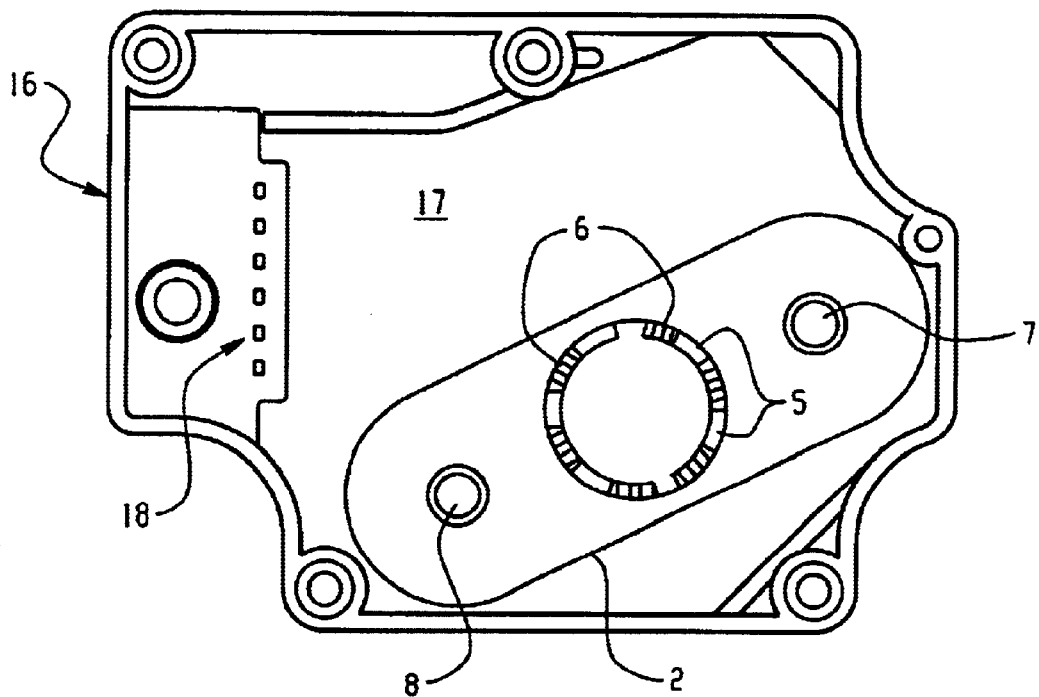
FIG. 7 represents a schematic plan view of such a motor placed in the housing of an actuator.

FIG. 7 represents very schematically the housing (16) of an actuator, for example, in which a motor based on the Invention is placed in contact with the housing base (17). A connector (18) provides the link between the actuator (16) and an electronic central processing unit.

Figure 8:
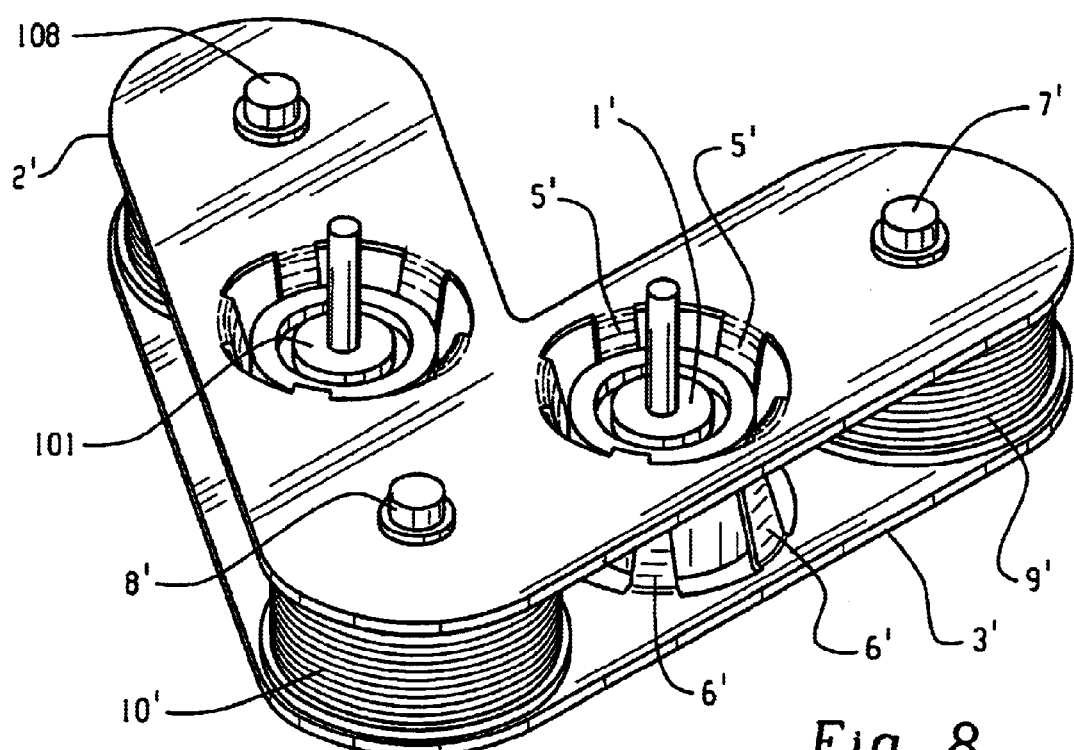
FIG. 8 is a perspective view of two motors combined in accordance with the invention.

FIG. 8 shows a V-shaped double motor, in which one can easily individualize the motors described previously. V-shaped plates (2, 3') replace the previous plates (2, 3) and the coil (10') is shared by the two motors as well as its spacer (8'). The second rotor (101) is located between the spacers (8') and (108). The minimal distance zones are situated, within the V, in the vicinity of the junction of the two arms.

A structure with more than two motors could, of course, be envisaged. More generally, the description above does not limit the invention, but constitutes only one example. The invention, on the contrary, encompasses the variants that are within the reach of the man of the art.

What is claimed is:

1. A dual rotor stepper motor comprising:
   (a) a pair of pole plates disposed in spaced arrangement;
   (b) a pair of rotor caged each formed by a cylindrical array of interdigitated teeth extending between the plates;
   (c) a pair of coils disposed between the plates and on opposite sides of each of the rotor cages, wherein the cages have a common core on one side thereof; and;
   (d) a permanent magnet rotor disposed in each cage and journalled on the plates for rotation.

2. The motor defined in claim 1 wherein the plates have a generally V-shaped arrangement with the common core disposed at the apex thereof.

* * * * *